United States Patent [19]

Cartier et al.

[11] Patent Number: 4,527,619
[45] Date of Patent: Jul. 9, 1985

[54] EXOATMOSPHERIC CALIBRATION SPHERE

[75] Inventors: Francis R. Cartier; David N. Stager, both of Manhattan Beach; Roy M. Acker, Los Angeles, all of Calif.

[73] Assignee: The United States of America as represented by the Secretary of the Army, Washington, D.C.

[21] Appl. No.: 635,854

[22] Filed: Jul. 30, 1984

[51] Int. Cl.³ .................... F64G 1/50; F28D 15/00
[52] U.S. Cl. ......................... 165/41; 165/104.26; 244/158 R; 244/163
[58] Field of Search ................ 165/41, 104.26; 244/158 R, 158 A, 159, 163

[56] References Cited

U.S. PATENT DOCUMENTS

| | | | |
|---|---|---|---|
| 3,152,774 | 10/1964 | Wyatt | 244/163 |
| 3,490,718 | 1/1970 | Vary | 165/104.26 |
| 3,535,543 | 10/1970 | Dailey | 165/104.26 |
| 3,548,930 | 12/1970 | Byrd | 165/104.26 |
| 3,620,298 | 11/1971 | Somerville | 165/104.26 |
| 3,675,711 | 7/1972 | Billinski | 165/104.26 |
| 3,714,981 | 2/1973 | Noren | 165/104.26 |
| 3,847,208 | 11/1974 | Ollendorf | 244/163 |

*Primary Examiner*—Albert W. Davis, Jr.
*Attorney, Agent, or Firm*—Anthony T. Lane; Robert P. Gibson; Harold W. Hilton

[57] ABSTRACT

A sphere which provides a high emissivity, uniform, isothermal calibration source which is fully instrumented for surface temperature and range measurements. The characteristics are achieved by using high thermal conductivity copper hemispheres disposed in spaced, concentric relation and containing a distributed heat pipe therebetween to minimize surface temperature gradients.

9 Claims, 2 Drawing Figures

EXOATMOSPHERIC CALIBRATION SPHERE

DEDICATORY CLAUSE

The invention described herein was made in the course of or under a contract with the Government and may be manufactured, used, and licensed by or for the Government for governmental purposes without the payment to us of any royalties thereon.

BACKGROUND OF THE INVENTION

In the use of space-based long wave infrared sensors, it has been very difficult to achieve good high accuracy sensor calibration. This is due to the deficiencies of ground based pre-flight calibration techniques. The solution was to develop a precision space-baced reference which could be used to precisely calibrate the sensors in their actual operating environment. The objective is to achieve $\geq 5\%$ radiometric sensor accuracy and precision. In order to achieve these accuracies, a calibration target that had an emissivity of $>0.9$, surface temperature gradients of $<2°K$., and surface temperature knowledge, and known range measurement was required.

The device of the present invention is a 20 inch diameter sphere which provides a high emissivity, uniform isothermal calibration source which is fully instrumented for surface temperature and range measurements. The characteristics are achieved by using a pair of high thermal conductivity copper hemispheres disposed in substantially concentric relation and whose inner surface contains a distributed heat pipe to minimize surface temperature gradients. The external surface is coated with 3M-410, CIO black paint resulting in an $\alpha/\epsilon=0.95/0.90$, an emissivity of $>0.92$ and surface temperature gradients $<1°K$.

SUMMARY OF THE INVENTION

A calibration sphere housing electronics such as batteries, S-band transponder, thermo-couples, etc. for surface temperature and range measurements. The support electronics are enclosed in an inner container to minimize contact with an exterior shell which is spaced from the inner container. Heat pipe mesh wicking covers essentially all interior surfaces of the enclosed annular volume and is formed to connect the inner and outer surfaces. The annular volume is sealed after evacuation and charged with a heat pipe working fluid.

DESCRIPTION OF THE PREFERRED EMBODIMENT

Figure 1:
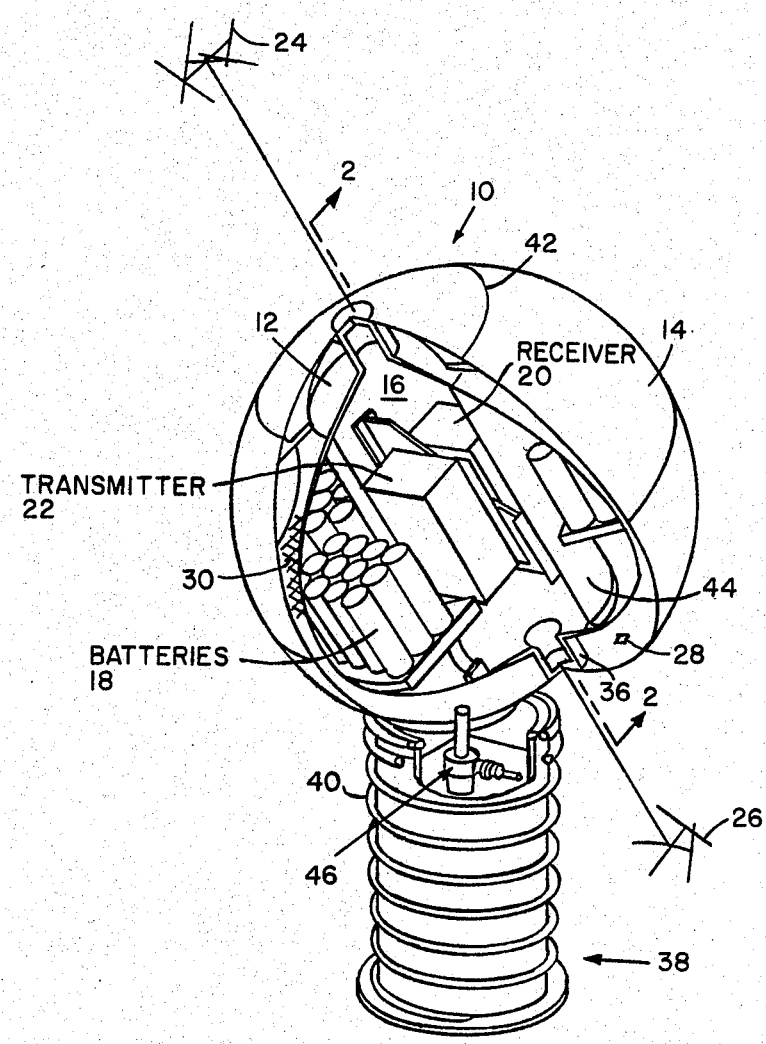
FIG. 1 is a partially cut-away pictorial view of the calibration sphere of the present invention including the support electronics.

As seen in FIG. 1, a calibration sphere 10 is shown to include inner and outer substantially spherical members 12 and 14, respectively. Inner sphere 12 encloses support electronics 16 which may typically include nickel cadmium batteries 18, a receiver 20 and transmitter 22, a receive antenna 24 and transmit antenna 26. Thermocouples 28 are mounted on the inner surface to provide telemetry data.

Figure 2:
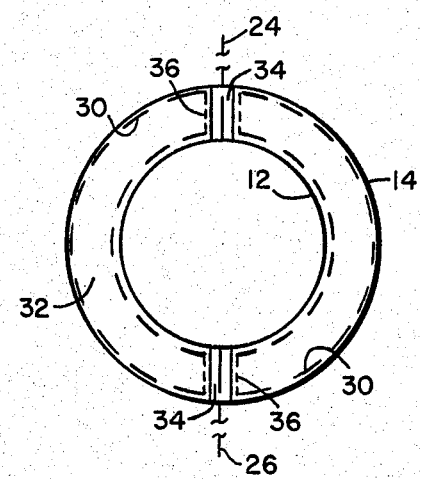
FIG. 2 is a sectional view as seen along line 2—2 of FIG. 1 illustrating the construction of the calibration sphere, the support electronics being omitted.

FIG. 2 illustrates the heat pipe structure to minimize surface temperature gradients (the payload has been omitted for clarity). As seen in FIG. 2, inner and outer spherical members 12 and 14 include surfaces which are provided with mesh wicking 30 thereon and a vapor filled volume 32 is provided between inner and outer spheres 12 and 14. The mesh wicking 30 provides liquid transport from cool to warmer zones on both spheres. Inner spherical member 12 is hermetically sealed to isolate the support electronics from the heat pipe fluid.

An antenna feed through 34 is provided in two places in the spheres and a pair of cylindrical structural supports 36 are secured to both spheres at these positions.

As stated, supra, the support electronics are enclosed in the inner sphere 12 to minimize contact with the exterior spherical shell 14 and the heat pipe mesh wicking (100 mesh screen, for example) covers essentially all of the interior surfaces of the enclosed volume. This volume is sealed after evacuation and charging with the heat pipe working fluid. Several working fluids are available. Methanol is desired for several reasons. It is well-characterized and is compatible with copper which is malleable and has high thermal conductivity. The vapor pressure of methanol is an order of magnitude lower than any other good candidate, which is important because the spheres are relatively large volume, large diameter pressure vessels. Additionally, methanol has a very low freezing temperature and good thermal conductivity.

As seen in FIG. 1 the complete assembly includes a base member 38 having an ejection spring 40 thereon for ejecting the calibration sphere 10 into the desired position in space. Additionally, as shown in FIG. 1, outer sphere 14 includes an access door 42 for support electronics installation and a cylindrical cannister 44 in the inside spherical member 12 which slides out for access to the battery shelves. A ball cock release mechanism 46 is provided to be actuated by a pyrotechnic pin puller for release of the sphere prior to ejection thereof.

The sphere, support structure, and battery shelf are assembled and brazed into an integral unit. The sensors are bonded into place through hand holds in the outer sphere. Hermetic feedthroughs for their leads are incorporated in the access port covers. The ports are then sealed.

The batteries are potted into clusters and bolted to the battery shelf. The central cylinder containing the transmitter, receiver, and thermocouple electronics is then slid into the sphere as an assembly. The heat pipe volume between the two spheres is pumped down and then filled with the working fluid.

We claim:

1. A space-based calibration source including support electronics for medium-wave and long-wave infrared sensors having electronics therein for providing range measurements and surface temperature measurements comprising:
    a. a pair of spherical members disposed in substantially concentric, spaced relation to form an annular space therebetween; and
    b. heat pipe means disposed in said annular space forming an integral, bi-directional structure for minimizing surface temperature gradients on said calibration source.

2. A space-based calibration source as in claim 1 wherein said heat pipe means includes wire wick meshing disposed on the outer surface of said inner sphere and the inner surface of said outer sphere.

3. A space-based calibration source as in claim 2 including a heat pipe working fluid disposed in said annular space.

4. A space-based calibration source as in claim 3 wherein said inner sphere is hermetically sealed.

5. A space-based calibration source as in claim 4 including a pair of support members disposed between each of said spheres for secured relation therebetween, said support members also being covered with said wire wick meshing.

6. A space-based calibration source as in claim 5 including a pair of openings through said spheres to receive a transmitting antenna and a receiving antenna respectively therein.

7. A space-based calibration source as in claim 6 wherein said heat pipe working material is methanol.

8. A space-based calibration source as in claim 7 wherein said spheres are copper.

9. A space-based calibration source as in claim 8 that provides a known surface temperature and range.

* * * * *